United States Patent
Ota et al.

(10) Patent No.: US 7,975,316 B2
(45) Date of Patent: Jul. 5, 2011

(54) ATOMIC FORCE MICROSCOPE AND INTERACTION FORCE MEASUREMENT METHOD USING ATOMIC FORCE MICROSCOPE

(75) Inventors: Masahiro Ota, Kyoto (JP); Noriaki Oyabu, Kyoto (JP); Masayuki Abe, Takarazuka (JP); Oscar Custance, Tukuba (JP); Yoshiaki Sugimoto, Minoh (JP); Seizo Morita, Minoh (JP)

(73) Assignees: Osaka University, Osaka (JP); Shimadzu Corporation, Kyoto (JP)

( * ) Notice: Subject to any disclaimer, the term of this patent is extended or adjusted under 35 U.S.C. 154(b) by 188 days.

(21) Appl. No.: 12/523,661

(22) PCT Filed: Jan. 7, 2008

(86) PCT No.: PCT/JP2008/000001
§ 371 (c)(1),
(2), (4) Date: Jul. 17, 2009

(87) PCT Pub. No.: WO2008/087852
PCT Pub. Date: Jul. 24, 2008

(65) Prior Publication Data
US 2010/0071099 A1 Mar. 18, 2010

(30) Foreign Application Priority Data
Jan. 17, 2007 (JP) .................. 2007-007580

(51) Int. Cl.
*G01B 5/28* (2006.01)
(52) U.S. Cl. .............. 850/33; 73/105; 977/863
(58) Field of Classification Search .......... 850/33; 73/102; 977/863.977
See application file for complete search history.

(56) References Cited

U.S. PATENT DOCUMENTS 5,966,053 A * 10/1999 Durig et al. .............. 331/116 M
(Continued)

FOREIGN PATENT DOCUMENTS

JP 2006-289542 A 10/2006

OTHER PUBLICATIONS

M. A. Lantz, et al., "Site-specific force-distance characteristics on NaCI(001): Measurements versus atomistic simulations", Physical Review B, 2006, pp. 245426-1 through 245426-9, vol. 74.
M. Abe, et al., "Room-temperature reproducible spatial force spectroscopy using atom-tracking technique", Applied Physics Letters, 2005, pp. 173503-1 through 173503-3, vol. 87.

(Continued)

*Primary Examiner* — David P Porta
*Assistant Examiner* — Jason McCormack
(74) *Attorney, Agent, or Firm* — Sughrue Mion, PLLC

(57) ABSTRACT

A frequency shift $\Delta f$ obtained by an FM-AFM can be expressed by a simple linear coupling of a $\Delta f_{LR}$ derived from a long-range interaction force and a $\Delta f_{SR}$ derived from a short-range interaction force. Given this factor, a $\Delta f$ curve on an atomic defect and a $\Delta f$ curve on a target atom on the sample surface are each measured for only a relatively short range scale (S1 and S2), and a difference $\Delta f$ curve of those two curves is obtained (S3). Since the difference $\Delta f$ curve is derived only from a short-range interaction force, a known conversion operation is applied to this curve obtain an F curve which illustrates the relationship between the force and the distance Z, and then the short-range interaction force on the target atom is obtained from the F curve (S4). Since the range scale in measuring the $\Delta f$ curve can be narrowed, the measurement time can be shortened, and since the conversion from the $\Delta f$ curve into F curve is required only once, the computational time can also be shortened. Consequently, in obtaining the short-range interaction force which acts between the atom on the sample surface and the probe, the time required for the $\Delta f$ curve's measurement and the computational time are shortened, which leads to accuracy improvement and throughput enhancement.

7 Claims, 8 Drawing Sheets

(a) ON ATOMIC DEFECT (b) ON TARGET ATOM

U.S. PATENT DOCUMENTS

| | | | | |
|---|---|---|---|---|
| 6,605,941 B2* | 8/2003 | Abe | | 324/244 |
| 6,768,095 B2* | 7/2004 | Niwa et al. | | 250/216 |
| 7,400,144 B2* | 7/2008 | Tsuji et al. | | 324/300 |
| 7,836,757 B2* | 11/2010 | Kitamura | | 73/105 |
| 2005/0212529 A1* | 9/2005 | Huang et al. | | 324/633 |

OTHER PUBLICATIONS

U. Dürig, "Extracting interaction forces and complementary observables in dynamic probe microscopy," Applied Physics Letters, Feb. 2000, pp. 1203 through 1205, vol. 76, No. 9.

F. J. Giessibl, "A direct method to calculate tip-sample forces from frequency shifts in frequency-modulation atomic force microscopy", Applied Physics Letters, Jan. 2001, pp. 123 through 125, vol. 78, No. 1.

John E. Sader, et al. "Accurate formulas for interaction force and energy in frequency modulation force spectroscopy", Applied Physics Letters, Mar. 2004, pp. 1801 through 1803, vol. 84, No. 10.

Noriaki Oyabu, et al., "Single Atomic Contact Adhesion and Dissipation in Dynamic Force Microscopy", Physical Review Letters, Mar. 2006, pp. 106101-1 through 106101-4, vol. 96.

Yoshiaki Sugimoto, et al., "Real topography, atomic relaxations, and short-range chemical interactions in atomic force microscopy: The case of the $\alpha$-Sn/Si(111)-($\sqrt{3}$x$\sqrt{3}$)R30° surface", Physical Review B, 2006, pp. 205329-1 through 205329-9, vol. 73.

M. A. Lantz, et al., "Quantitative Measurement of Short-Range Chemical Bonding Forces", Science, 2001, pp. 2580 through 2583, vol. 291.

* cited by examiner

(a) ON ATOMIC DEFECT (b) ON TARGET ATOM

(a) Δf CURVE

CONVERSION COMPUTATION PROCESS BASED ON A THEORY (b) F CURVE

ATOMIC FORCE MICROSCOPE AND INTERACTION FORCE MEASUREMENT METHOD USING ATOMIC FORCE MICROSCOPE

TECHNICAL FIELD

The present invention relates to an atomic force microscope (AFM). In particular, it relates to a frequency modulation atomic force microscope (Frequency Modulation-AFM or FM-AFM), and an interaction force measurement method for measuring a short-range interaction force which acts between a probe and a sample surface when the probe is adjacent to the sample surface by using an atomic force microscope.

BACKGROUND ART

An atomic force microscope (AFM) is an apparatus for measuring the force which interacts between a probe with a sharp tip and a sample surface from the displacement of a cantilever, and one-dimensionally or two-dimensionally scanning the sample surface with the probe to obtain the sample surface's information, e.g. its geometry. One known type of AFM is an FM-AFM with a frequency modulation detection system. In an FM-AFM, a cantilever holding a probe approximate to the distance from the sample surface at the atomic level is oscillated with the mechanical resonance frequency, and the resonance frequency's variation (or frequency shift $\Delta f$) is detected which is caused by the interaction force acting between the probe and the sample surface. Since the frequency shift $\Delta f$ depends on the distance Z between the probe and the sample surface, by performing a two-dimensional scan (e.g. raster scan) of the sample surface in a plane orthogonal to the normal direction on the sample while keeping the frequency shift $\Delta f$ constant, a concave-convex observation image (or $\Delta f$ constant image) of the sample surface can be obtained.

Although it is possible to obtain much information from the interaction force between the probe and the sample surface as will be described later, an FM-AFM has a disadvantage in that the interaction force cannot be directly and experimentally obtained. Therefore, the relationship (which will be hereinafter called a "$\Delta f$ curve") between the frequency shift $\Delta f$ and the probe-sample surface distance Z is measured as previously described, and a conversion calculation based on a theory described in Non-Patent Documents 1 through 3 for example is performed to obtain the relationship between the interaction force F and the probe-sample surface distance Z (which will be hereinafter called an "F curve"). In addition, using the relationship that the interaction force F is a potential gradient, the potential energy curve between the probe and the sample surface can also be deduced from the F curve.

Roughly speaking, the interaction force between the probe and the sample surface consists of a long-range interaction force ($F_{LR}$: Long-Range Force) which mainly acts when the distance Z is within a range from a few nm to several tens of nm, and a short-range interaction force ($F_{SR}$: Short-Range Force) which acts when the distance Z is as small as 1 nm or less. The sum of these forces acts as a total interaction force ($F_{total}$: Total Force). The long-range interaction force $F_{LR}$ includes for example a van der Waals force $F_{vdw}$ between the probe and the sample surface, and an electrostatic force $F_{ele}$ caused by the contact potential difference between the probe and the sample surface. On the other hand, an example of the short-range interaction force $F_{SR}$ is a covalent force that acts between semiconductor atoms. It is known that the short-range interaction force $F_{SR}$ not only contributes to the sample surface's concave-convex observation at the atomic resolution, but reflects the atomic-level configuration of the tip of the probe (refer to Non-Patent Document 4). Moreover, it has been reported that the difference in the short-range interaction force $F_{SR}$ of the atomic species can be utilized for the atomic species' identification (refer to Non-Patent Document 5).

Figure 14:
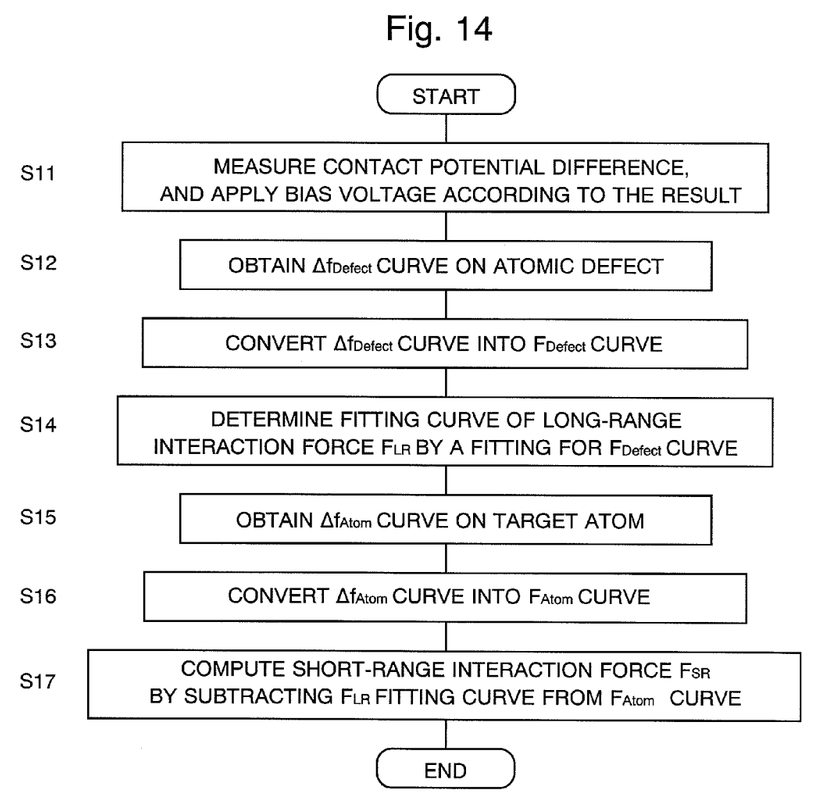
FIG. 14 is a flow chart illustrating the procedure of a conventional short-range interaction force measurement method using an atomic force microscope.
Figure 15:
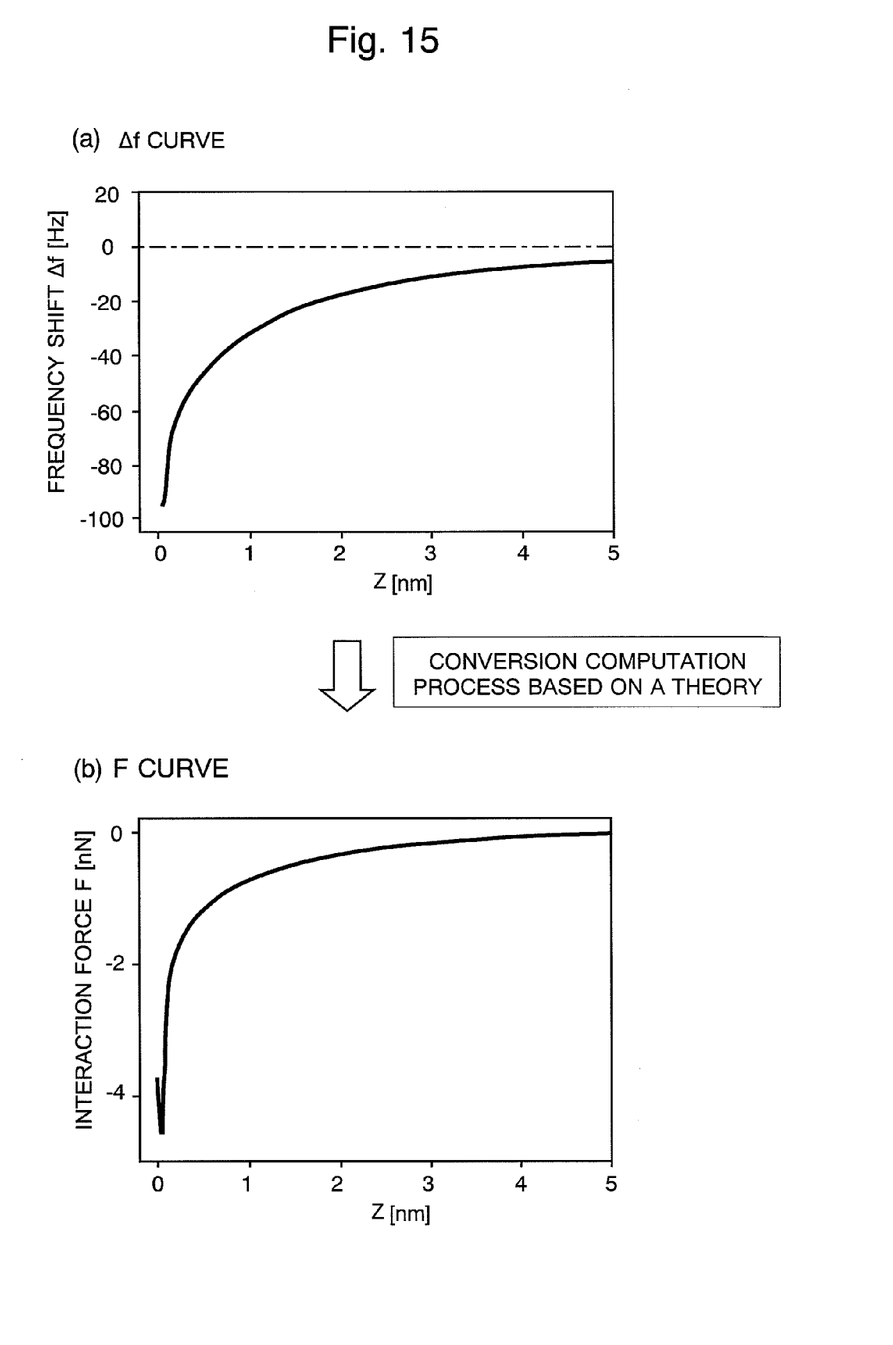
FIG. 15 is a diagram illustrating a Δf curve and F curve for explaining a conventional short-range interaction force measurement method using an atomic force microscope.

Therefore, in order to obtain various pieces of information about a sample at the atomic level, the technique of accurately measuring the short-range interaction force $F_{SR}$ has been recently required. A conventional and general procedure (refer to Non-Patent Document 6) for measuring, by using an atomic force microscope, the short-range interaction force $F_{SR}$ acting on a target atom existing on the sample surface will now be schematically explained. FIG. 14 is a flowchart illustrating this procedure, and FIG. 15 is a graph illustrating an example of the $\Delta f$ curve and F curve.

First, the contact potential difference between the probe and the sample surface is measured, and a bias voltage which compensates this contact potential difference is applied between the probe and the sample surface to make the electrostatic force $F_{ele}$ negligible (Step S11). Since the van der Waals force $F_{vdw}$ and the electrostatic force $F_{ele}$ are dominant in the long-range interaction force $F_{LR}$, in the state where the electrostatic force $F_{ele}$ is negligible, the van der Waals force $F_{vdw}$ can be regarded as the only dominant component.

Next, using the atomic force microscope, a $\Delta f$ curve is obtained on an atomic defect (or Defect), where only the long-range interaction force $F_{LR}$ acts between the probe and the sample surface. As illustrated in FIG. 15(a), a $\Delta f$ curve is a graph with the probe-sample surface distance Z assigned to the horizontal axis and the frequency shift $\Delta f$ to the longitudinal axis. In the case where the interaction force acting between the probe and the sample surface is an attracting force, the frequency shift $\Delta f$ becomes a negative value and asymptotically gets closer to zero as the distance Z increases. The $\Delta f$ curve on the atomic defect is labeled as the $\Delta f_{Defect}$ curve (Step S12). The position of the atomic defect can be visually recognized on the FM-AFM concave-convex observation image of the sample surface. At this point in time, in order to apply the conversion theory from the $\Delta f$ curve into F curve as described in Non-Patent Document 2 for example, it is required to measure the $\Delta f$ curve over a distance range that is large enough for the frequency shift $\Delta f$ to become substantially zero. Generally, this distance is approximately several tens of nm.

A conversion computation from the frequency shift $\Delta f$ into the interaction force F is performed based on the aforementioned, publicly known conversion theory, whereby the $F_{Defect}$ curve which illustrates the relationship between the interaction force and the probe-sample surface distance Z on the atomic defect is obtained from the $\Delta f_{Defect}$ curve (Step S13). As illustrated in FIG. 15(b), an F curve is a graph with the probe-sample surface distance Z assigned to the horizontal axis and the interaction force F to the longitudinal axis.

Using a van der Waals force model or the like in which the sample surface is assumed to be flat and the tip of the probe spherical, a fitting is performed to the $F_{Defect}$ curve to check the validity of the assumed model. This process determines the fitting curve of the long-range interaction force $F_{LR}$ (Step S14). In practice, however, in the case where the objective is to obtain only the long-range interaction force $F_{LR}$, it is not necessary to obtain the fitting curve of the long-range interaction force $F_{LR}$ but the $F_{Defect}$ curve may be directly used.

Subsequently, using the atomic force microscope, a $\Delta f$ curve is obtained on the target atom. This $\Delta f$ curve reflects both the short-range interaction force $F_{SR}$ and the long-range interaction force $F_{LR}$. The Δf curve is labeled as the $\Delta f_{Atom}$ curve (Step S15). The position of the target atom can also be determined from the FM-AFM concave-convex observation image of the sample surface. This $\Delta f_{Atom}$ curve also requires the measurement of the range up to approximately several tens of nm as in the case of the $\Delta f_{Defect}$ curve.

As in Step S13, a conversion from the frequency shift Δf into the interaction force F is performed based on the conversion theory, whereby the $F_{Atom}$ curve which illustrates the relationship between the interaction force and the probe-sample surface distance Z on the target atom is obtained from the $\Delta f_{Atom}$ curve (Step S16).

Since the $F_{Atom}$ curve reflects the sum of the long-range interaction force and the short-range interaction force, an $F_{SR}$ curve is computed by subtracting the fitting curve of the long-range interaction force $F_{LR}$ which has been obtained in Step S14 from the $F_{Atom}$ curve (or by subtracting $F_{Defect}$ curve). From this $F_{SR}$ curve, the short-range interaction force $F_{SR}$ on the target atom is obtained (Step S17).

However, the aforementioned conventional method for computing the short-range interaction force $F_{SR}$ has some problems as follows.

(1) Generally, the contact potential difference between the semiconductor surface and a silicon probe for example is approximately within ±1V. In Step S11, an appropriate bias voltage which corresponds to this voltage is applied between the probe and the sample surface to experimentally minimize the electrostatic force $F_{ele}$. However, applying this bias voltage does not always make the electrostatic force $F_{ele}$ completely zero, whose effect may not be negligible and decrease the accuracy. In addition, in the case of an insulator sample such as an ionic crystal, the compensation of the contact potential difference is virtually impossible since it is difficult to apply a bias voltage between the probe's tip and the sample surface.

(2) In many FM-AFMs, a piezoelectric element is used for controlling the microscopic distance between the probe and the sample surface. In such a case, it is necessary to significantly change the applied voltage to the piezoelectric element to obtain a Δf curve with a long range scale. This might cause the piezoelectric element's creep (i.e. a phenomenon in which a gradual displacement occurs even while the applied voltage is kept constant), which causes concern about the accuracy decrease of the position control. In addition, since the acquisition of a Δf curve with a long range scale requires a long measurement time, the effect of the drift of the probe-sample surface distance due to the thermal expansion of the probe or sample becomes prominent. Therefore, the range scale for measuring the Δf curve should preferably be as short as possible.

(3) In performing the conversion from a Δf curve into an F curve using the method described in Non-Patent Document 2, a few through several tens of minutes' computational time is required, depending on the computing speed of the computer. For example, with a workstation with a Xeon 3 GHz dual processor produced by Intel Corporation in the United States, the conversion from a Δf curve with one thousand and twenty four points into an F curve requires more than five minutes. With the aforementioned conventional method, this time-consuming computation must be performed two times, i.e. in Steps S13 and S16, which further elongates the analysis time. In particular, although obtaining the short-range interaction force of only one point poses no problem, obtaining the short-range interaction force of a plurality of points takes an impractically long period of time.

[Non-Patent Document 1] U. Durig, "Extracting interaction forces and complementary observables in dynamic probe microscopy," *Applied Physics Letters*, vol. 76 (2000), pp. 1203-1205

[Non-Patent Document 2] F. J. Giessibl, "A direct method to calculate tip-sample forces from frequency shifts in frequency-modulation atomic force microscopy," *Applied Physics Letters*, vol. 78 (2001), pp. 123-125

[Non-Patent Document 3] John E. Sader et al., "Accurate formulas for interaction force and energy in frequency modulation force spectroscopy," *Applied Physics Letters*, vol. 84 (2004), pp. 1801-1803

[Non-Patent Document 4] Noriaki Oyabu et al., "Single Atomic Contact Adhesion and Dissipation in Dynamic Force Microscopy," *Physical Review Letters*, vol. 96 (2006), pp. 106101-1 through 106101-4

[Non-Patent Document 5] Yoshiaki Sugimoto et al., "Real topography, atomic relaxations, and short-range chemical interactions in atomic force microscopy: The case of the α-Sn/Si(111)-(√3×√3)R30° surface," *Physical Review B*, vol. 73 (2006), pp. 205329-1 through 205329-9

[Non-Patent Document 6] M. A. Lantz et al., "Quantitative Measurement of Short-Range Chemical Bonding Forces," *Science*, vol. 291 (2001), pp. 2580-2583

DISCLOSURE OF THE INVENTION

Problems to be Solved by the Invention

The present invention has been accomplished to solve a variety of problems as previously described, and the objective thereof is to provide an atomic force microscope and an interaction force measurement method using the atomic force microscope in which the range scale of the measurement of a Δf curve is narrowed and the time required for the measurement is shortened to alleviate the influence of the piezoelectric element's creep and thermal drift of relative distance between the probe and the sample surface.

Another objective of the present invention is to provide an atomic force microscope and an interaction force measurement method using the atomic force microscope in which the computation that conventionally required a considerable amount of time even with a high-performance computer is more quickly completed to enhance the throughput and in particular to enable the easy obtainment of the short-range interaction force at a plurality of points on the sample surface.

Means for Solving the Problems

As a result of a technical investigation and consideration based on the past studies, the inventors of the present invention have reached the new finding that a frequency shift Δf can be expressed by a simple linear coupling of a frequency shift ΔfLR derived from a long-range interaction force $F_{LR}$ and a frequency shift ΔfSR derived from a short-range interaction force $F_{SR}$. According to this finding, the operation of obtaining the short-range interaction force on a certain atom does not follow the conventional procedure of independently converting two Δf curves each obtained on the target atom and on the atomic defect to obtain two F curves and then computing the difference of these two F curves, but follows the simple procedure of computing the difference at the stage of two Δf curves and converting the single Δf curve of difference obtained as a result of the computation to obtain a single F curve.

That is, the interaction force measurement method using an atomic force microscope according to the present invention is a measurement method for measuring a short-range interaction force acting between an atom of a sample surface and the tip of a probe, by using a frequency modulation atomic force microscope for detecting, in oscillating with the resonance frequency a cantilever for holding the probe approximated to the sample surface, an oscillation frequency of the cantilever holding the probe, the oscillation frequency varying due to an interaction acting between an atom of the sample surface and the tip of the probe, and the measurement method including:

a) an on-atom measurement step for measuring, on a target atom on the sample surface, an on-atom $\Delta f$ curve which illustrates the relationship between the distance Z between the tip of the probe and the sample surface and a variation (frequency shift) $\Delta f$ of the oscillation frequency from the resonance frequency;

b) an on-defect measurement step for measuring, on an atomic defect on the sample surface, an on-defect $\Delta f$ curve which illustrates the relationship between the distance Z between the tip of the probe and the sample surface and a variation $\Delta f$ of the oscillation frequency from the resonance frequency;

c) a difference computation step for calculating a difference $\Delta f$ curve which is the difference between the on-atom $\Delta f$ curve and the on-defect $\Delta f$ curve; and d) a conversion computation step for performing a computation of converting a frequency variation in the difference $\Delta f$ curve into an interaction force to obtain a short-range interaction force.

The $\Delta f$ curve obtained on the target atom reflects the sum of the frequency shift $\Delta f_{LR}$ derived from the long-range interaction force and the frequency shift $\Delta f_{SR}$ derived from the short-range interaction force, and it can be considered that on the atomic defect the $\Delta f$ curve reflects only the frequency shift $\Delta f_{LR}$ derived from the long-range interaction force because the short-range interaction force does not act. Therefore, the difference $\Delta f$ curve, which is the difference between the two $\Delta f$ curves, reflects only the frequency shift $\Delta f_{SR}$ derived from the short-range interaction force. Since it can be assumed that there is no longer any influence of the long-range interaction force on the conversion of the difference $\Delta f$ curve into an F curve, it is sufficient that, in order to apply the conversion theory, a $\Delta f$ curve is obtained within the range scale in which the short-range interaction force acts.

Given these factors, the $\Delta f$ curve with the range of the distance Z up to 1 nm and below may be obtained in the on-atom measurement step and the on-defect measurement step. In practice, it is unusual that the extent of 1 nm is required; in many cases a $\Delta f$ curve with the range of the distance Z of 0.5 nm and below is sufficient. Accordingly, the range scale in which the $\Delta f$ curve is to be measured can be considerably shorter than in conventional methods.

The target atom and atomic defect can be visually checked on a concave-convex observation image obtained by an FM-AFM. Therefore, for the position of the target atom and that of the atomic defect for obtaining the short-range interaction force using the aforementioned method, the two following methods are possible: a manual specification by a user looking at a concave-convex observation image and an automatic extraction from a concave-convex observation image using an image recognition or other techniques.

That is, the first aspect of the atomic force microscope according to the present invention for performing the interaction force measurement method according to the aforementioned invention provides a frequency modulation atomic force microscope for detecting, in oscillating with the resonance frequency a cantilever for holding a probe approximated to a sample surface, an oscillation frequency of the cantilever holding the probe, the oscillation frequency varying due to an interaction acting between an atom of the sample surface and the tip of the probe, and the atomic force microscope including:

a) a concave-convex observation image obtaining means for one-dimensionally or two-dimensionally scanning a predetermined area of the sample surface and simultaneously forming and displaying a concave-convex observation image of the sample surface;

b) a specification means for allowing a user to specify at least one target atom and one atomic defect on the concave-convex observation image displayed by the concave-convex observation image obtaining means;

c) an on-atom measurement performing means for measuring, on the sample surface and on the target atom specified by the specification means, an on-atom $\Delta f$ curve which illustrates a relationship between the distance Z between the tip of the probe and the sample surface and the variation (frequency shift) $\Delta f$ of the oscillation frequency from the resonance frequency;

d) an on-defect measurement performing means for measuring, on the sample surface and on the atomic defect specified by the specification means, an on-defect $\Delta f$ curve which illustrates the relationship between the distance Z between the tip of the probe and the sample surface and the variation $\Delta f$ of the oscillation frequency from the resonance frequency;

e) a difference computation means for calculating the difference $\Delta f$ curve which is a difference between the on-atom $\Delta f$ curve and the on-defect $\Delta f$ curve; and f) a conversion computation means for performing a computation of converting a frequency variation in the difference $\Delta f$ curve into an interaction force to obtain a short-range interaction force.

With the atomic force microscope according to the first aspect of the present invention, it is possible to obtain the short-range interaction force for a target atom at any position on the sample surface. Although only a long-range interaction force acts on an atomic defect, generally a long-range interaction force is affected at a distance between a few dozens through a few hundreds (or more) of nm. Hence, if the target atom and atomic defect for which an $\Delta f$ curve is measured are distant from each other, the long-range interaction force which acts may differ due to the influence of the sample surface's concavity and convexity, shape, and other factors. In the meantime, with the atomic force microscope according to the aforementioned aspect of the present invention, the user can use his or her judgment to select an atomic defect closest or relatively close to the target atom to be measured. Therefore, the short-range interaction force can be accurately computed.

The second aspect of the atomic force microscope according to the present invention for performing the interaction force measurement method according to the aforementioned invention provides a frequency modulation atomic force microscope for detecting, in oscillating with the resonance frequency a cantilever for holding a probe approximated to a sample surface, an oscillation frequency of the cantilever holding the probe, the oscillation frequency varying due to an interaction acting between an atom of the sample surface and the tip of the probe, and the atomic force microscope including:

a) a concave-convex observation image obtaining means for one-dimensionally or two-dimensionally scanning a predetermined area of the sample surface and simultaneously forming a concave-convex observation image of the sample surface;

b) an extraction means for extracting at least one target atom and one atomic defect by performing an image analysis of the concave-convex observation image;

c) an on-atom measurement performing means for measuring, on the sample surface and on the target atom extracted by the extraction means, the on-atom $\Delta f$ curve which illustrates the relationship between the distance Z between the tip of the probe and the sample surface and the variation (frequency shift) $\Delta f$ of the oscillation frequency from the resonance frequency;

d) an on-defect measurement performing means for measuring, on the sample surface and on the atomic defect extracted by the extraction means, the on-defect $\Delta f$ curve which illustrates the relationship between the distance Z between the tip of the probe and the sample surface and the variation $\Delta f$ of the oscillation frequency from the resonance frequency;

e) a difference computation means for calculating the difference $\Delta f$ curve which is the difference between the on-atom $\Delta f$ curve and the on-defect $\Delta f$ curve; and f) a conversion computation means for performing the computation of converting a frequency variation in the difference $\Delta f$ curve into an interaction force to obtain a short-range interaction force.

The atomic force microscope according to the second aspect of the present invention may include a distribution information creator for sequentially obtaining the short-range interaction force for all or a portion of the atoms included within a predetermined range to create information illustrating the distribution of the short-range interaction force within the predetermined range.

With the atomic force microscope according to the second aspect of the present invention, a short-range interaction force can be automatically obtained for every atom. Therefore, it is easy, for example, to check the difference of forces directly above the atoms and create a mapping diagram of the forces directly above the entire amount of atoms included in a predetermined range.

As previously described, it is desirable that the position at which the on-atom $\Delta f$ curve is measured is close to the position at which the on-defect $\Delta f$ curve is measured. Hence, the extraction means may preferably impose some condition on the extraction of the target atom and atomic defect, such as selecting an atomic defect most adjacent to a given target atom.

The third aspect of the atomic force microscope according to the present invention for performing the interaction force measurement method according to the aforementioned invention provides a frequency modulation atomic force microscope for detecting, in oscillating with resonance frequency a cantilever for holding a probe approximated to the sample surface, an oscillation frequency of the cantilever holding the probe, the oscillation frequency varying due to an interaction acting between an atom of the sample surface and the tip of the probe, and the atomic force microscope including:

a) a concave-convex observation image obtaining means for one-dimensionally or two-dimensionally scanning a predetermined area of the sample surface and simultaneously forming a concave-convex observation image of the sample surface;

b) an on-atom measurement performing means for measuring, on the sample surface and at a predetermined position, an on-atom $\Delta f$ curve which illustrates the relationship between the distance Z between the tip of the probe and the sample surface and the variation (frequency shift) $\Delta f$ of the oscillation frequency from the resonance frequency;

c) an extraction means for extracting an atomic defect adjacent to the position where a measurement is to be performed or has been performed by the on-atom measurement performing means by performing an image analysis of the concave-convex observation image;

d) an on-defect measurement performing means for measuring, on the sample surface and on the atomic defect extracted by the extraction means, an on-defect $\Delta f$ curve which illustrates the relationship between the distance Z between the tip of the probe and the sample surface and a variation $\Delta f$ of the oscillation frequency from the resonance frequency;

e) a difference computation means for calculating the difference $\Delta f$ curve which is a difference between the on-atom $\Delta f$ curve and the on-defect $\Delta f$ curve; and f) a conversion computation means for performing a computation of converting a frequency variation in the difference $\Delta f$ curve into an interaction force to obtain a short-range interaction force at the position.

The atomic force microscope according to the third aspect of the present invention does not obtain a short-range interaction force directly above an atom, but a short-range interaction force at a predetermined position above the sample surface (e.g. at positions set at predetermined intervals in biaxial directions on a plane orthogonal to a normal to the sample). Hence, strictly speaking, the $\Delta f$ curve being measured is not always above an atom but may be above an atomic defect. It may otherwise be roughly above an atom but not directly. (However, for the sake of convenience, it is assumed that the curve being measured is an "on-atom $\Delta f$ curve" since the probability of being above an atomic defect is low in this case.)

In the case of the atomic force microscope according to the third aspect of the present invention, it is preferable that a distribution information creator is included for sequentially obtaining the short-range interaction force for each of a plurality of positions set within a predetermined range to create information illustrating the distribution of the short-range interaction force within the predetermined range.

With the atomic force microscope according to the third aspect of the present invention, it is easy, for example, to create a mapping diagram of a short-range interaction force at the intersection points of a lattice virtually drawn on the sample surface. Therefore, the sample's surface structure can be examined more precisely.

Effects of the Invention

With the atomic force microscope and the interaction force measurement method using an atomic force microscope according to the present invention, the influence of the electrostatic force which is a factor of a long-range interaction force disappears in the computational process. Therefore, it is not necessary to apply a bias voltage for neglecting the electrostatic force's influence, i.e. for compensating the contact potential difference between the probe and the sample surface. Hence, even for the sample such as an insulator sample to which a bias voltage is difficult to apply, a short-range interaction force can be obtained without being affected by the electrostatic force.

Conventionally, it has been necessary to obtain a $\Delta f$ curve with the range scale between a few and several tens of nm above each of the target atom and atomic defect. However, the present invention only requires the measurement of a $\Delta f$ curve with the range scale from 0.5 nm to at most approximately 1 nm. This reduces the amount of change in the voltage applied to the piezoelectric element for oscillating the probe, which decreases the piezoelectric element's creep and increases the accuracy of the distance control. This also prevents the probe from getting accidentally damaged by coming into contacting with the sample surface. In addition, since the time required for the measurement of a Δf curve can also be shortened, the distance between the probe and the sample surface is less influenced by a thermal drift during the measurement.

Conventionally a computational process of the conversion from a Δf curve into an F curve has been required twice. By contrast, the present invention requires this computational process only once. Since the time required for this computational process is relatively long, the time period for obtaining the result will be shortened because the number of computational processes is halved. This time-reduction effect and the aforementioned time-reduction effect for the Δf curve's measurement itself bring about the improvement in the throughput.

Moreover, the enhancement of the measurement throughput and the ease of analysis additionally make it easy to perform a two-dimensional mapping measurement of the short-range interaction force above a sample surface and a two-dimensional mapping measurement of the potential obtained from a short-range interaction force.

EXPLANATION OF NUMERALS

1 ... Cantilever
2 ... Probe
3 ... Piezoelectric Element
4 ... Oscillation Controller
5 ... Sample Stage
6 ... Vertical Position Scanner
7 ... Horizontal Position Scanner
8 ... Displacement Detector
9 ... FM Demodulator
10 ... Vertical Position Controller
11 ... Horizontal Position Controller
12 ... Main Controller
13 ... Operation Unit
14 ... Display
15 ... Image Processor
16 ... Interaction Force Computation Processor
17 ... Atom/Defect Locator

BEST MODE FOR CARRYING OUT THE INVENTION

First, the principle of the measurement method of the short-range interaction force according to the present invention will be described. As previously described, in an atomic force microscope, it is known that the total interaction force $F_{total}$ which acts between the probe's tip and the sample surface can be expressed by the sum of the short-range interaction force $F_{SR}$ and the long-range interaction force $F_{LR}$. The short-range interaction force $F_{SR}$ is generally dominated by the van der Waals force $F_{vdw}$ and the electrostatic force $F_{ele}$, and can be expressed by the sum of these two forces. Hence, the following equation (1) holds:

$$F_{total} = F_{SR} + F_{LR} = F_{SR} + (F_{vdw} + F_{ele}) \quad (1)$$

On the other hand, according to Non-Patent Document 3, the relationship between the frequency shift Δf and the interaction force F is expressed by the following equation (2):

$$\frac{\Delta f}{f_0} = -\frac{1}{\pi a k} \int_{-1}^{1} F[z + a(1+u)] \frac{u}{\sqrt{1-u^2}} du \quad (2)$$

where a is the oscillation amplitude of the cantilever for holding and oscillating the probe, k is the spring constant of the cantilever, and $f_0$ is the resonance frequency. Here, assigning the $F_{total}$ of the equation (1) to F of the equation (2) gives the following equation (3):

$$\frac{\Delta f}{f_0} = -\frac{1}{\pi a k} \int_{-1}^{1} \left\{ \begin{array}{l} F_{SR}[z+a(1+u)] + \\ F_{LR}[z+a(1+u)] \end{array} \right\} \frac{u}{\sqrt{1-u^2}} du \quad (3)$$

$$= -\frac{1}{\pi a k} \int_{-1}^{1} F_{SR}[z+a(1+u)] \frac{u}{\sqrt{1-u^2}} du -$$

-continued $$\frac{1}{\pi a k}\int_{-1}^{1}F_{LR}[z+a(1+u)]\frac{u}{\sqrt{1-u^2}}du$$

By using the following equations (4) and (5):

$$-\frac{1}{\pi a k}\int_{-1}^{1}F_{SR}[z+a(1+u)]\frac{u}{\sqrt{1-u^2}}du=\frac{\Delta f_{SR}}{f_0} \quad (4)$$

$$-\frac{1}{\pi a k}\int_{-1}^{1}F_{LR}[z+a(1+u)]\frac{u}{\sqrt{1-u^2}}du=\frac{\Delta f_{LR}}{f_0} \quad (5)$$

the equation (3) can be rewritten as the following equation (6):

$$\Delta f = \Delta f_{SR} + \Delta f_{LR} \quad (6)$$

The equation (6) signifies that the frequency shift $\Delta f$ is expressed by the linear coupling of the frequency shift $\Delta f_{LR}$ derived from the long-range interaction force $F_{LR}$ and the frequency shift $\Delta f_{SR}$ derived from the short-range interaction force $F_{SR}$.

In the meantime, the conversion formula from the frequency shift $\Delta f$ into the interaction force $F$ is expressed by the following equation (7) in Non-Patent Document 2:

$$F(z)=2k\int_{z}^{\infty}\left\{\left(1+\frac{a^{1/2}}{8\sqrt{\pi(t-z)}}\right)\Omega(t)-\frac{a^{3/2}}{\sqrt{2(t-z)}}\frac{d\Omega(t)}{dt}\right\}dt \quad (7)$$

where $$\Omega(z)=\Delta f(z)/f_0.$$

By assigning the following equation (8) to the equation (7), equation (9) is obtained:

$$\Omega(z)=\{\Delta f_{SR}(z)+\Delta f_{LR}(z)\}/f_0=\Omega_{SR}(z)+\Omega_{LR}(z) \quad (8)$$

$$F(z)=2k\int_{z}^{\infty}\left\{\left(1+\frac{a^{1/2}}{8\sqrt{\pi(t-z)}}\right)\Omega_{SR}(t)-\frac{a^{3/2}}{\sqrt{2(t-z)}}\frac{d\Omega_{SR}(t)}{dt}\right\}dt+$$

$$2k\int_{z}^{\infty}\left\{\left(1+\frac{a^{1/2}}{8\sqrt{\pi(t-z)}}\right)\Omega_{LR}(t)-\frac{a^{3/2}}{\sqrt{2(t-z)}}\frac{d\Omega_{LR}(t)}{dt}\right\}dt \quad (9)$$

The relationship between equations (4) and (5) shows that the first term of the right-hand side in the equation (9) corresponds to the short-range interaction force $F_{SR}$ and the second term of the right-hand side corresponds to the long-range interaction force $F_{LR}$.

This demonstrates that the short-range interaction force $F_{SR}$ can be obtained from the equation $\Omega_{SR}(z)=\Delta f_{SR}/f_0$.

Figure 1:
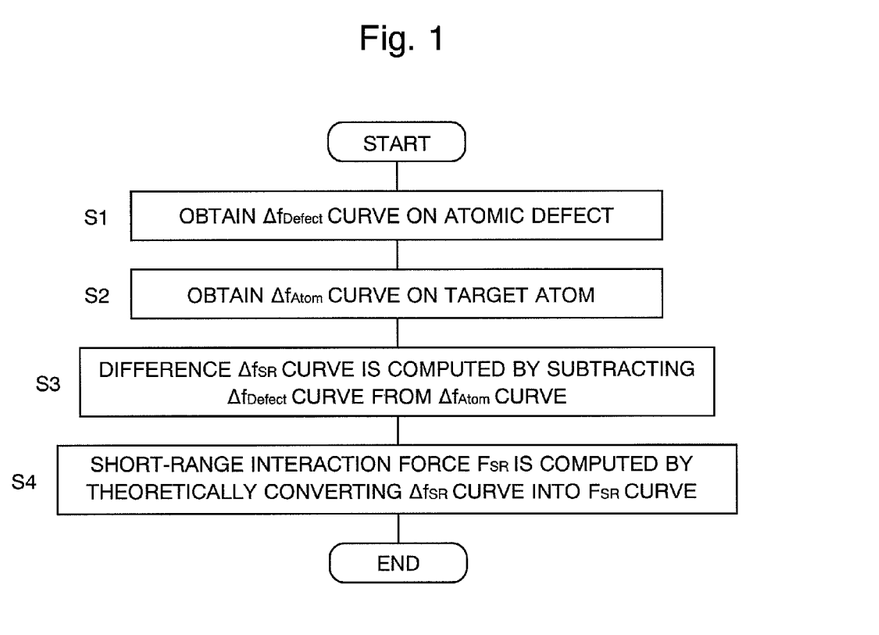
FIG. 1 is a flowchart illustrating the procedure of a short-range interaction force measurement method using an atomic force microscope which is an embodiment of the present invention.

Concretely speaking, in the measurement method according to an embodiment of the present invention, the short-range interaction force $F_{SR}$ is obtained in the procedure in accordance with the flowchart illustrated in FIG. 1. This measurement method is hereafter described using FIG. 2, which is a schematic diagram of a cantilever for holding a probe and the vicinity of the sample surface.

Figure 2:
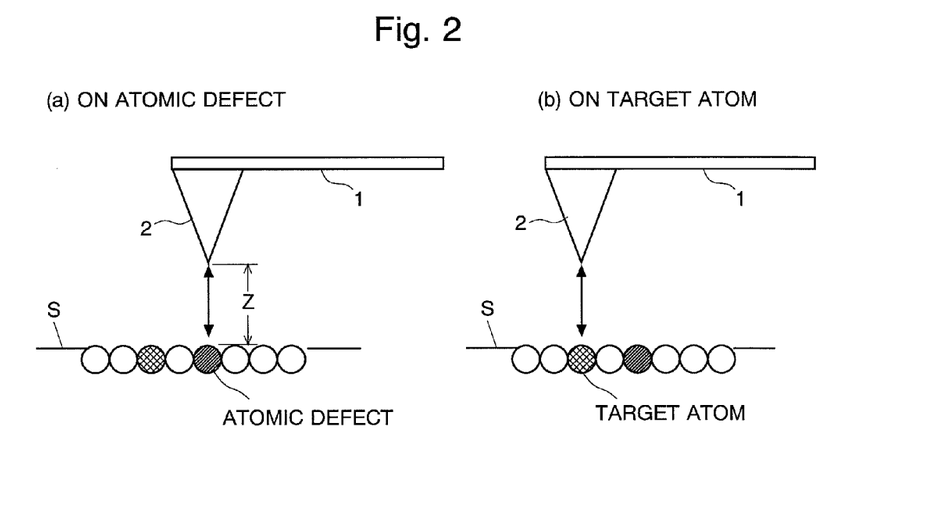
FIG. 2 is a schematic diagram for explaining the measurement method illustrated in FIG. 1.
Figure 3:
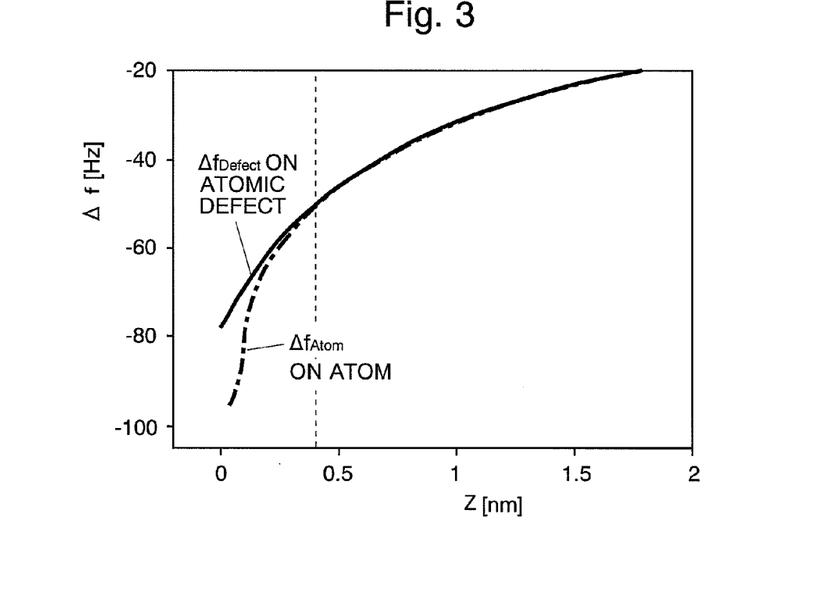
FIG. 3 is a diagram illustrating an example of the measurement result of a Δf curve above an atom and an atomic defect on the sample surface.

First, with an FM-AFM, a $\Delta f$ curve (or $\Delta f_{Defect}$ curve) on an atomic defect where a short-range interaction force does not act as illustrated in FIG. 2(a) is obtained (Step S1). To be more precise, the variation of the resonance frequency f, i.e. frequency shift $\Delta f$, is measured while the distance Z between the tip of the probe 2 and the surface of the sample S is gradually changed in the range from substantially zero (e.g. approximately 0.1 nm) to approximately 1 nm. As a result, a $\Delta f_{Defect}$ curve as drawn in a full line in FIG. 3 for example is obtained.

Next, with the same FM-AFM, a $\Delta f$ curve (or $\Delta f_{Atom}$ curve) on a target atom on which both the long-range interaction force $F_{LR}$ and short-range interaction force $F_{SR}$ act is obtained as illustrated in FIG. 2(b) (Step S2). The method is the same as in the acquisition of the $\Delta f_{Defect}$ curve, except for the difference of the measurement position. As a result, a $\Delta f_{Atom}$ curve as drawn in an alternate long and short dash line in FIG. 3 for example is obtained.

The $\Delta f_{Defect}$ curve is the frequency shift $\Delta f_{LR}$ derived from the long-range interaction force $F_{LR}$, and the $\Delta f_{Atom}$ curve is $\Delta f_{LR}+\Delta f_{SR}$ which is the sum of the frequency shift $\Delta f_{LR}$ derived from the long-range interaction force $F_{LR}$ and the frequency shift $\Delta f_{SR}$ derived from the short-range interaction force $F_{SR}$. Therefore, the difference between the $\Delta f_{Defect}$ curve and the $\Delta f_{Atom}$ curve should equal the frequency shift $\Delta f_{SR}$ derived from the short-range interaction force $F_{SR}$. Given this factor, a difference curve is obtained by subtracting the $\Delta f_{Defect}$ curve from the $\Delta f_{Atom}$ curve (Step S3). This difference curve can be considered to be derived only from the short-range interaction force $F_{SR}$ and is therefore the $\Delta f_{SR}$ curve. Hence, a conversion computation in accordance with the aforementioned theory based on Non-Patent Document 2 for example is performed for the difference curve to obtain an interaction force F curve. Then, from this F curve, the short-range interaction force $F_{SR}$ on the target atom is determined (Step S4). For example, since an F curve has a definite minimum value as will be described later, the minimum value can be set to be the small-range interaction force $F_{SR}$.

Embodiments

One example of the concrete measurement result by the measurement method in accordance with the aforementioned procedure will be explained, being compared to a conventional measurement method.

Figure 4:
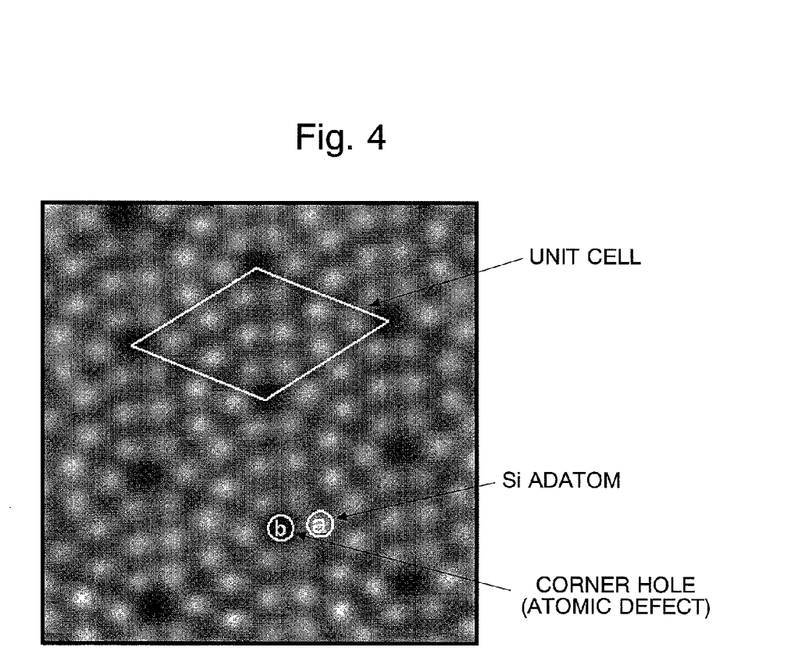
FIG. 4 is an FM-AFM concave-convex observation image of a Si(111)7×7 reconstructed surface image in an ultra-high vacuum.

As the sample surface which is to be measured, a Si(111) 7×7 reconstructed surface was used. FIG. 4 is an FM-AFM concave-convex observation image of the sample surface in an ultra-high vacuum. The scan range was 8 nm×8 nm. On the sample surface (first layer), a rhombic unit cell composed of twelve Si adatoms (or adsorbed atoms) exists, and an atomic defect which is called a corner hole is observed at each of the four corners of the unit cell.

Figure 5:
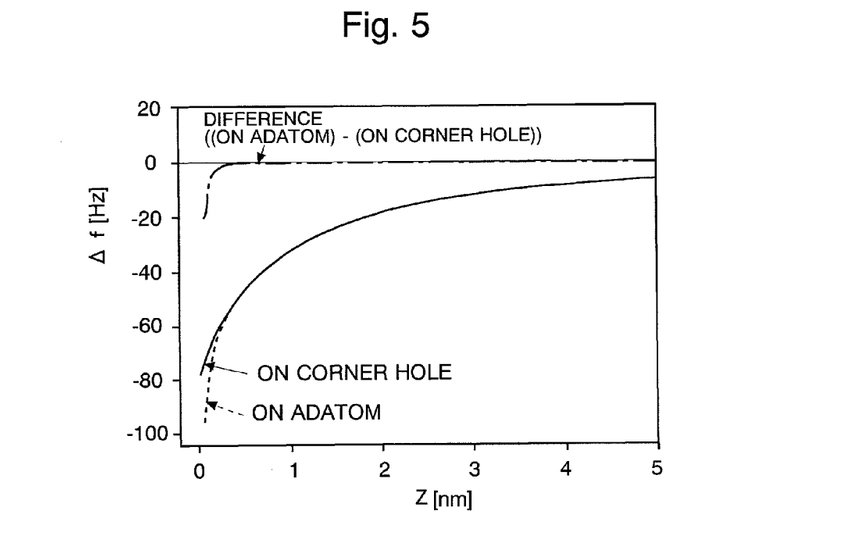
FIG. 5 is a diagram illustrating a Δf curve above the adatom of the sample of FIG. 4, a Δf curve above the corner hole of the same sample, and the curve of both curves' difference.

For the sample surface, the contact potential difference between the probe and the sample surface was measured and it was as small as 22.5 mV. Therefore, the bias voltage to be applied between the probe and the sample surface was set to be zero. (Although the application of a bias voltage is not necessary in the measurement method according to the present invention, a bias voltage was taken into account since a measurement of a conventional method was simultaneously performed.) Under such a condition, a $\Delta f_{Atom}$ curve on the adatom in FIG. 4 was obtained as the $\Delta f$ curve derived from the short-range interaction force $F_{SR}$ and the long-range interaction force $F_{LR}$. And, a $\Delta f_{Defect}$ curve on the corner hole in FIG. 4 was obtained as the $\Delta f$ curve derived only from the long-range interaction force $F_{LR}$. These two $\Delta f$ curves (i.e. $\Delta f_{Atom}$ curve and $\Delta f_{Defect}$ curve) obtained as just described and a curve of the difference of these curves are illustrated in FIG. 5. As previously described, since this difference curve is a $\Delta f_{SR}$ curve, the aforementioned conversion process was performed to the difference curve to compute the $F_{SR}$ curve.

Figure 6:
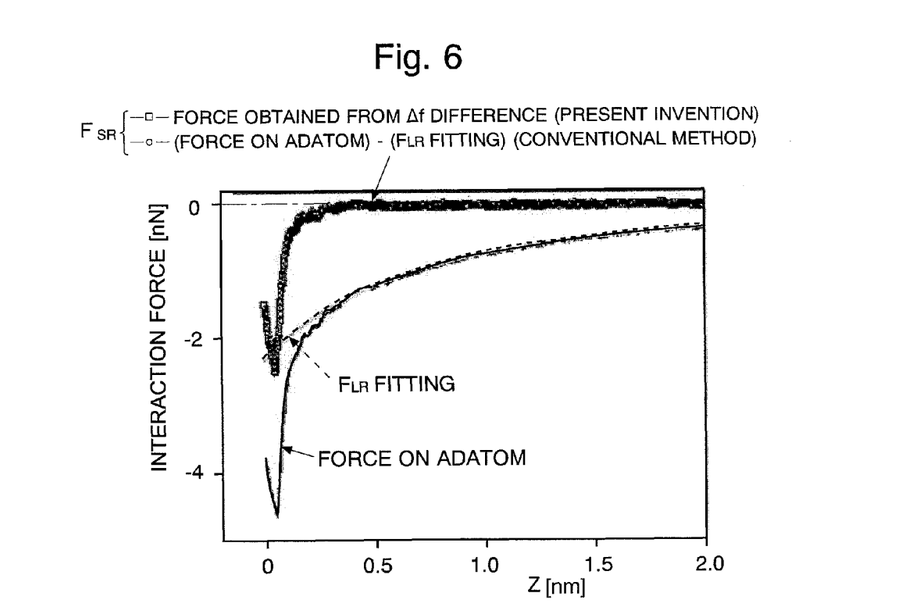
FIG. 6 is a diagram for comparing the short-range interaction force obtained by the measurement method according to the present invention and the short-range interaction force obtained by a conventional method.

Meanwhile, the conventional method was also performed as illustrated in the flowchart of FIG. 14, including the conversion process of $\Delta f_{Defect}$ curve and $\Delta f_{Atom}$ curve into an $F_{Defect}$ curve and $F_{Atom}$ curve, respectively, and the fitting process for the $F_{Defect}$ curve to obtain an $F_{LR}$ fitting curve. FIG. 6 illustrates the $F_{SR}$ curve obtained by the present invention and the $F_{SR}$ curve obtained by the conventional method. The minimum value of each short-range interaction force was −2.31 nN for the present invention and −2.45 nN for the conventional method; the difference between these values was merely 6%. This result demonstrates that the present invention can yield measurement results that are comparable to those obtained by the conventional method.

In the aforementioned measurement example, it could be assumed that the electrostatic force $F_{ele}$ was negligible since the contact potential difference between the probe and the sample surface was very small. Therefore, in order to suppose a state where the electrostatic force $F_{ele}$ is not negligible, a measurement was performed in the state where a bias voltage was applied to the sample so as to artificially apply an electrostatic force between the probe and sample surface.

Figure 7:
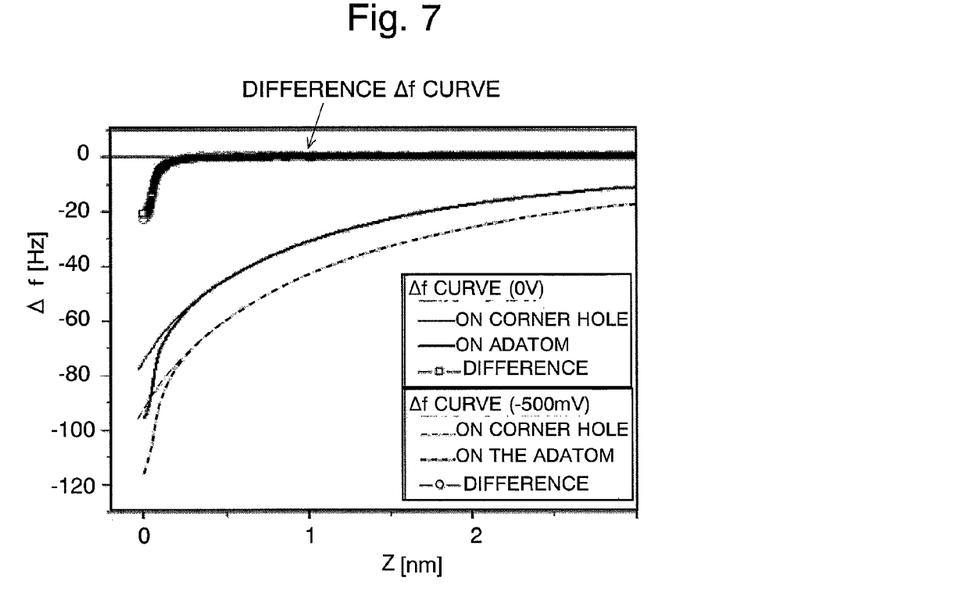
FIG. 7 is a diagram illustrating a Δf curve for explaining the difference between the short-range interaction forces with and without an electrostatic force.
Figure 8:
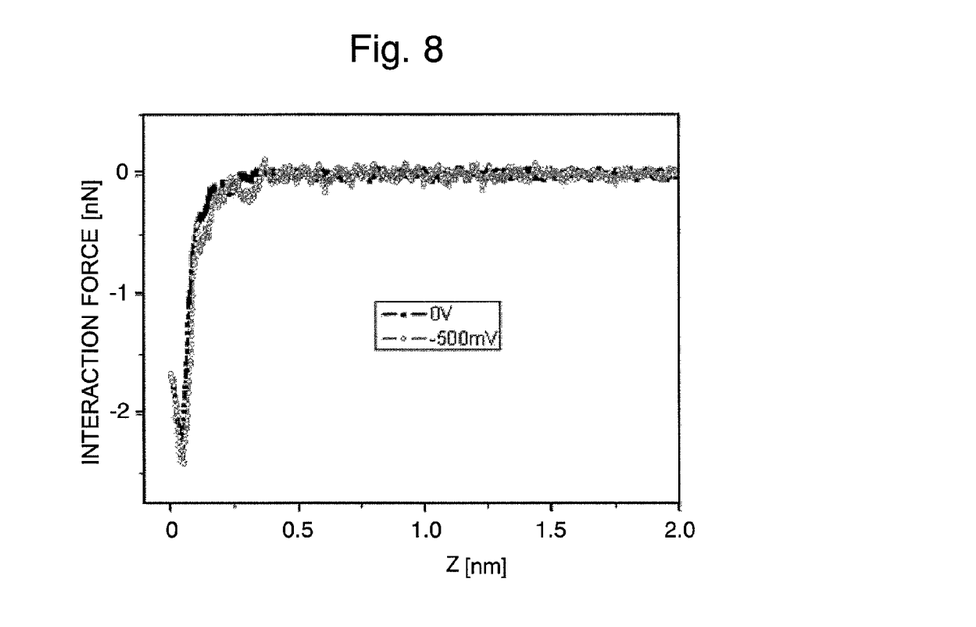
FIG. 8 is a diagram illustrating an F curve for explaining the difference between the short-range interaction forces with and without an electrostatic force.

FIG. 7 illustrates each difference $\Delta f$ curve for the bias voltage of 0V and −500 mV. It is shown that these differences $\Delta f$ curves correspond well. FIG. 8 illustrates $F_{SR}$ curves obtained by converting each of these two difference $\Delta f$ curves into the interaction force. The minimum value of the short-range interaction force $F_{SR}$ with the bias voltage of 0V was −2.31 nN, and that with the bias voltage of −500 mV was −2.41 nN. The difference between them is merely 4%, which demonstrates a good correspondence. That is, even in the case where a non-negligible level of electrostatic force exists between the probe and sample surface, the short-range interaction force $F_{SR}$ can be accurately obtained without applying a bias voltage for compensating the electrostatic force. In addition, FIGS. 7 and 8 show that each of the $\Delta f$ and $F_{SR}$ curves becomes substantially zero at the distance Z equal to or more than 1 nm, which indicates that the measurement of a $\Delta f$ curve in the range scale of less than approximately 1 nm is sufficient for the measurement method according to the present invention.

Figure 9:
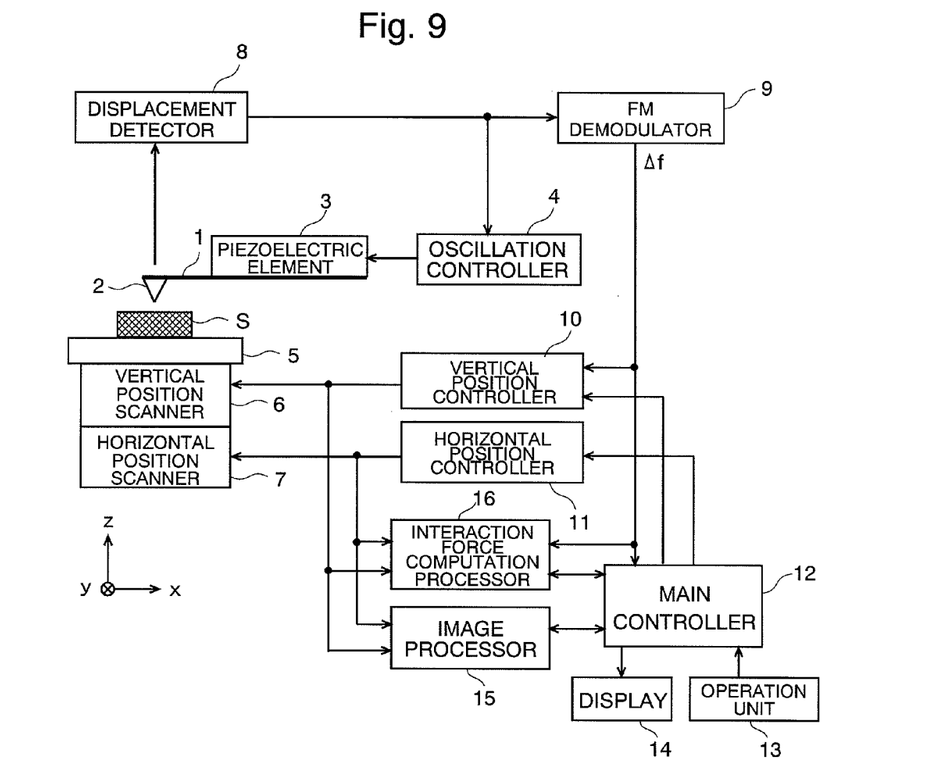
FIG. 9 is a schematic configuration diagram of an atomic force microscope which is an embodiment of the present invention.
Figure 10:
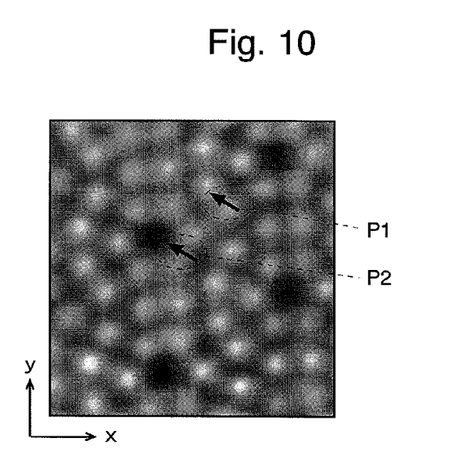
FIG. 10 is a diagram for explaining the short-range interaction force measurement operation using the atomic force microscope illustrated in FIG. 9.

Next, an embodiment of the FM-AFM using the short-range interaction force measurement method according to the present invention will be described with reference to FIGS. 9 and 10. FIG. 9 is a schematic block configuration diagram of the FM-AFM of the present embodiment and FIG. 10 is a diagram for explaining the measurement operation.

In FIG. 9, a probe 2 is mounted on one end of a micro-sized cantilever 1 shaped like a flat spring whose length is 100 through 200 μm for example, and a piezoelectric element 3 as an oscillation unit is mounted on the other end of the cantilever 1. The piezoelectric element 3 is microscopically displaced by the voltage applied from an oscillation controller 4, whereby the cantilever 1 is oscillated at the resonance frequency. The characteristic resonance frequency fr of the cantilever 1 is approximately $fr=½π×\sqrt{(k/m)}$, where k is the spring constant of the cantilever 1 and m is the mass of the probe.

A sample S to be measured is placed on a sample stage 5. The sample stage 5 is freely movable in the vertical direction (or z-axis direction) by a vertical position scanner 6, and is freely movable in the two-dimensional directions (or x-axis and y-axis directions) within a horizontal plane by a horizontal position scanner 7. When the probe 2 is moved closer to the surface of the sample S while the probe 2 is oscillated at the resonance frequency fr and with a predetermined amplitude, a mechanical interaction acts between the probe 2 and the surface of the sample S. This interaction force changes the resonance frequency fr of the cantilever 1. The magnitude of this change, i.e. the frequency shift $\Delta f$, becomes negative in the case where an attraction force acts between the probe 2 and the surface of the sample S, and becomes positive in the case where a repulsive force acts.

A displacement detector 8 detects a mechanical displacement of the probe 2, and is for example composed of: a light source; a two-divided (or four-divided) light detector; and a computational circuit for computationally processing a plurality of detection signals from the light detector. The displacement detection signal by the displacement detector 8 is provided to a frequency modulation (FM) demodulator 9, and the FM demodulator 9 performs an FM demodulation to the displacement detection signal to detect the resonance frequency's variation, i.e. the frequency shift $\Delta f$. The FM demodulator 9 can be constituted by, for example, a phase-locked loop (PLL), a resonance circuit using an inductor and capacitor, a variety of filters, or other units.

The oscillation controller 4 applies a voltage to the piezoelectric element 3 so that the cantilever 1 will oscillate at the resonance frequency as described earlier. In this state, the sample S is moved in the z-direction by the vertical position scanner 6 to bring the sample S close to the tip of the probe 2. Then, the mechanical interaction which acts between the probe 2 and the sample S as previously described changes the effective spring constant of the cantilever 1, so that the resonance frequency is changed. Since this change appears on the amount of displacement of the probe 2 (i.e. one end of the cantilever 1), the FM demodulator 9 detects the resonance frequency's variation (or frequency shift $\Delta f$) based on the displacement detection signal produced by the displacement detector 8, and provides this detection signal to a vertical position controller 10, a main controller 12, and an interaction force computation processor 16.

The vertical position controller 10 controls the vertical position scanner 6 to change the distance Z between the probe 2 and the samples S in the z-axis direction. On the other hand, a horizontal position controller 11 controls the horizontal position scanner 7 to biaxially move the sample S in the x-axis and y-axis directions in order to scan the measurement position above the sample S by the probe 2. Both the vertical position controller 10 and the horizontal position controller 11 are controlled overall by the main controller 12.

In obtaining a concave-convex observation image of a predetermined two-dimensional area above the sample S for example, the vertical position controller 10 drives the vertical position scanner 6 to displace the sample stage 5 in the z-axis direction so that the frequency shift $\Delta f$ given from the FM demodulator 9 becomes constant. Simultaneously, the horizontal position controller 11 moves the horizontal position scanner 7 in such a manner that the measurement position by the probe 2 is moved within the predetermined two-dimensional area. In this operation, the amount of displacement $\Delta z$ in the z-axis direction corresponds to the concavity and convexity and the shape of the surface of the sample S. Therefore, an image processor 15 creates a concave-convex observation image from the address indicating the position in the x-axis and y-axis directions on the sample S set by the horizontal position controller 11 and the amount of displacement $\Delta z$. Consequently, a concave-convex observation image as illustrated in FIG. 10 for example can be created.

Using the frequency shift Δf provided from the FM demodulator 9, the probe-sample surface distance Z set by the vertical position controller 10, and the address indicating the position in the x-axis and y-axis directions above the sample S set by the horizontal position controller 11, the interaction force computation processor 16 performs a predetermined computational process as described earlier to compute the short-range interaction force. To the main controller 12, an operation unit 13 to be operated by a user and a display 14 on which a two-dimensional image can be displayed are connected.

A portion or entirety of the functions of the main controller 12, image processor 15, interaction force computation processor 16, and other units can be realized by executing dedicated control/process software installed in a personal computer.

The measurement of the short-range interaction force by the FM-AFM according to the present embodiment is performed in the following manner. First, the user provides an instruction through the operation unit 13 to obtain a concave-convex observation image of the desired area above the sample S. In response to this, the main controller 12 controls each unit as previously described to obtain the concave-convex observation image as illustrated in FIG. 10, and displays this image on the screen of the display 14. The user checks this concave-convex observation image and specifies the position of the target atom whose short-range interaction range is to be examined with an arrow P1 superimposed on the screen for example. The user also specifies the position of an atomic defect by indicating it with an arrow P2 superimposed on the screen for example. In this operation, it is generally preferable to specify the atomic defect as close to the target atom as possible. It is of course possible to directly specify the positions of the target atom and atomic defect by, for example, entering their x-y addresses or the like.

After the specification of the atom and atomic defect, the main controller 12 first controls the horizontal position controller 11 in order that the specified atomic defect comes directly below the tip of the probe 2, whereby the horizontal position scanner 7 is driven to move the sample S in the x-y plane. After that, the main controller drives the vertical position scanner 6 by the vertical position controller 10, to move the sample S in the z-axis direction in such a manner that the distance Z between the tip of the probe 2 and the sample S becomes very small, e.g. 0.1 nm. From this state, the frequency shift Δf is detected while gradually increasing the distance Z (e.g. up to 1 nm), and the distance Z and the frequency shift Δf are read by the interaction force computation processor 16. Consequently, the Δf curve on the atomic defect is obtained.

Next, the main controller 12 controls the horizontal position controller 11 in order that the specified target atom comes directly below the tip of the probe 2, whereby the horizontal position scanner 7 is driven to move the sample S in the x-y plane. After that, as in the aforementioned manner, the frequency shift Δf is detected while gradually changing the distance Z within the range between 0.1 and 1 nm for example, and the distance Z and the frequency shift Δf are read by the interaction force computation processor 16. Consequently, the Δf curve on the target atom is obtained.

The interaction force computation processor 16 computes the difference Δf curve from the two Δf curves, computes the F curve by performing a conversion process to this difference Δf curve, obtains the short-range interaction force from this F curve, and displays the F curve on the display 14. Consequently, the short-range interaction force directly above the target atom specified by the user is obtained. Thus, the short-range interaction force on the atom at any position can be obtained according to necessity.

Figure 11:
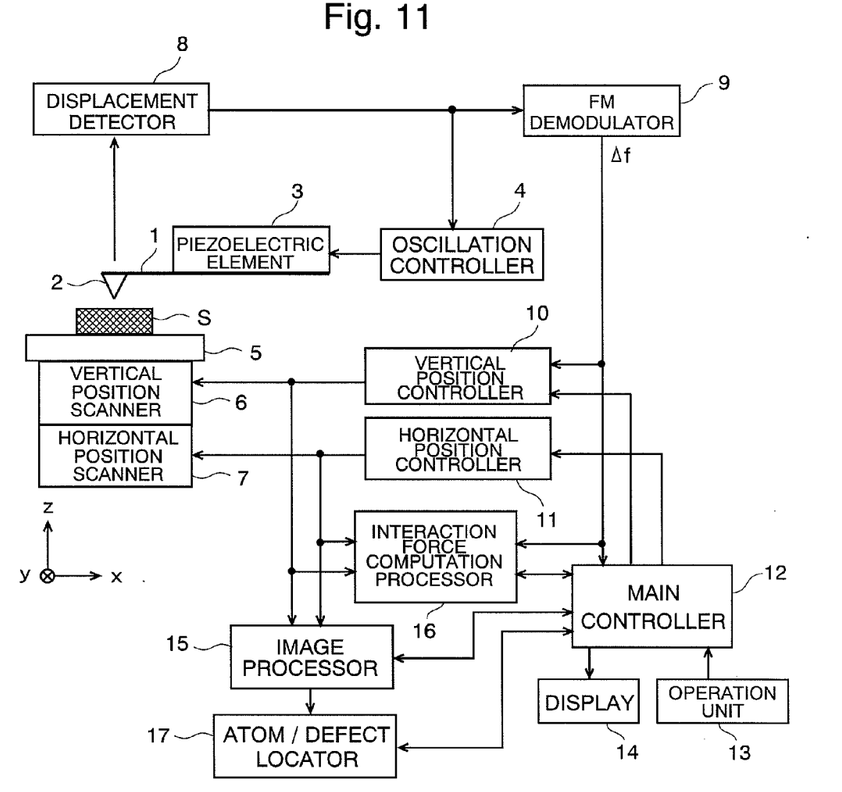
FIG. 11 is a schematic configuration diagram of an atomic force microscope which is another embodiment of the present invention.

In the FM-AFM of the aforementioned embodiment, the user has to visually observe a concave-convex observation image and specify the position of the target atom and atomic defect. However, the measurement position may be automatically determined by detecting a characteristic shape or color of the atom or defect. FIG. 11 is a schematic block configuration diagram of an FM-AFM according to such another embodiment. The same or corresponding components as in FIG. 9 are indicated with the same numerals. The major difference from the previous embodiment is that the present system has an atom/defect locator 17 for performing an image recognition processing to the concave-convex observation image formed in the image processor 15 to automatically locate the atom and that of the atomic defect.

Figure 12:
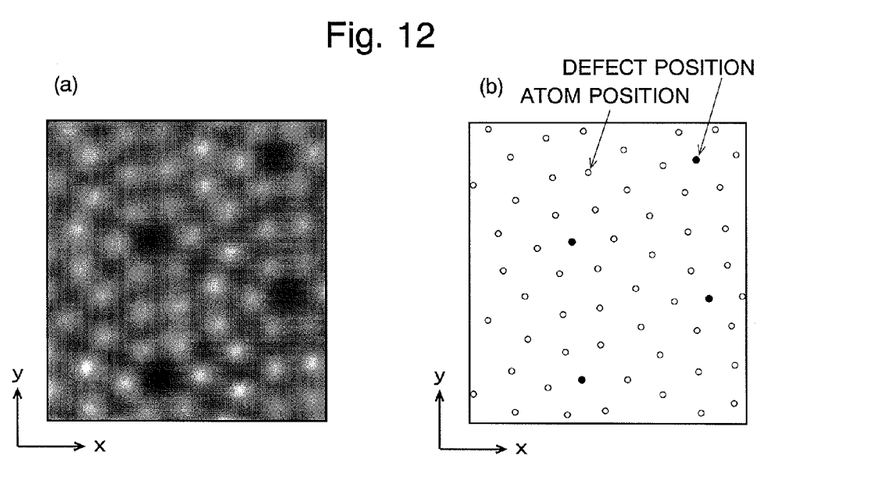
FIG. 12 is a diagram for explaining the short-range interaction force measurement operation using the atomic force microscope illustrated in FIG. 11.

The atom/defect locator 17 executes a process to the concave-convex observation image as illustrated in FIG. 12(a) for example to determine the atom position (or atom's center position) and defect position as illustrated in FIG. 12(b), and calculate the x-y address of each position. Then, using the atom position and defect position determined by the atom/defect locator 17, the main controller 12 controls each unit so that a measurement and operation are performed for computing the short-range interaction force as previously described. For example, each atom position illustrated in FIG. 12(b) is paired with the closest defect position, and a short-range interaction force is obtained for each pair. The short-range interaction forces directly above the entire amount of atoms whose position has been specified in the area as illustrated in FIG. 12(b) can be obtained. Based on these forces, it is possible to create a distribution image (e.g. contour image) of the short-range interaction force directly above the atoms.

Figure 13:
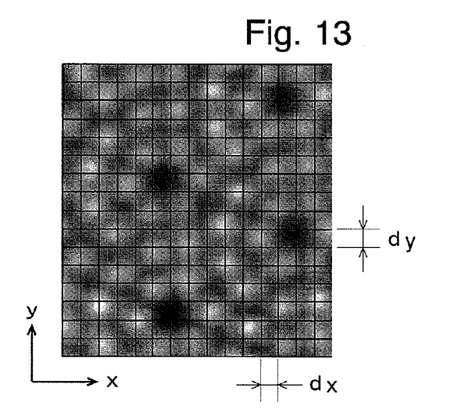
FIG. 13 is a diagram for explaining the short-range interaction force measurement operation using an atomic force microscope according to still another embodiment.

In the previously described embodiment, the short-range interaction forces directly above the atoms are obtained and their distribution image for example can be created. Alternatively, the short-range interaction force at a previously determined position in a predetermined two-dimensional area for example on the sample may be obtained to create their distribution image. In one example illustrated in FIG. 13, the intersection points of a lattice with the spacing dx in the x-axis direction and dy in the y-axis direction are set to be the measurement points, and these measurement points are regarded as the atom positions. Each atom position is paired with the closest defect position, and the short-range interaction force is obtained for each pair. In this manner, the short-range interaction force for each of the measurement positions can be obtained. By this method, it is possible to create a distribution image of the short-range interaction forces not directly above the atoms but at positions off the directly-above position (or on the inclined surface on the atoms' upper side).

It should be noted that the aforementioned embodiments are merely an example of the present invention, and therefore it is evident that any modification, adjustment, or addition appropriately made within the spirit of the present invention is also covered by the claims of the present patent application.

The invention claimed is:

1. A frequency modulation atomic force microscope for detecting, in oscillating with a resonance frequency a cantilever for holding a probe approximated to a sample surface, an oscillation frequency of the cantilever holding the probe, the oscillation frequency varying due to an interaction acting between an atom of the sample surface and a tip of the probe, and the atomic force microscope comprising:

a) a concave-convex observation image obtaining means for one-dimensionally or two-dimensionally scanning a predetermined area of the sample surface and simultaneously forming and displaying a concave-convex observation image of the sample surface;
b) a specification means for allowing a user to specify at least one target atom and one atomic defect on the concave-convex observation image displayed by the concave-convex observation image obtaining means;
c) an on-atom measurement performing means for measuring, on the sample surface and on the target atom specified by the specification means, an on-atom Δf curve which illustrates a relationship between a distance Z between the tip of the probe and the sample surface and a variation (frequency shift) Δf of the oscillation frequency from the resonance frequency;
d) an on-defect measurement performing means for measuring, on the sample surface and on the atomic defect specified by the specification means, an on-defect Δf curve which illustrates a relationship between a distance Z between the tip of the probe and the sample surface and a variation Δf of the oscillation frequency from the resonance frequency;
e) a difference computation means for calculating a difference Δf curve which is a difference between the on-atom Δf curve and the on-defect Δf curve; and
f) a conversion computation means for performing a computation of converting a frequency variation in the difference Δf curve into an interaction force to obtain a short-range interaction force.

2. A frequency modulation atomic force microscope for detecting, in oscillating with a resonance frequency a cantilever for holding a probe approximated to a sample surface, an oscillation frequency of the cantilever holding the probe, the oscillation frequency varying due to an interaction acting between an atom of the sample surface and a tip of the probe, and the atomic force microscope comprising:
a) a concave-convex observation image obtaining means for one-dimensionally or two-dimensionally scanning a predetermined area of the sample surface and simultaneously forming a concave-convex observation image of the sample surface;
b) an extraction means for extracting at least one target atom and one atomic defect by performing an image analysis of the concave-convex observation image;
c) an on-atom measurement performing means for measuring, on the sample surface and on the target atom extracted by the extraction means, an on-atom Δf curve which illustrates a relationship between a distance Z between the tip of the probe and the sample surface and a variation (frequency shift) Δf of the oscillation frequency from the resonance frequency;
d) an on-defect measurement performing means for measuring, on the sample surface and on the atomic defect extracted by the extraction means, an on-defect Δf curve which illustrates a relationship between a distance Z between the tip of the probe and the sample surface and a variation Δf of the oscillation frequency from the resonance frequency;
e) a difference computation means for calculating a difference Δf curve which is a difference between the on-atom Δf curve and the on-defect Δf curve; and
f) a conversion computation means for performing a computation of converting a frequency variation in the difference Δf curve into an interaction force to obtain a short-range interaction force.

3. The atomic force microscope according to claim 2, further comprising a distribution information creator for sequentially obtaining the short-range interaction force for all or a portion of atoms included within a predetermined range to create information illustrating a distribution of the short-range interaction force within the predetermined range.

4. A frequency modulation atomic force microscope for detecting, in oscillating with a resonance frequency a cantilever for holding a probe approximated to a sample surface, an oscillation frequency of the cantilever holding the probe, the oscillation frequency varying due to an interaction acting between an atom of the sample surface and a tip of the probe, and the atomic force microscope comprising:
a) a concave-convex observation image obtaining means for one-dimensionally or two-dimensionally scanning a predetermined area of the sample surface and simultaneously forming a concave-convex observation image of the sample surface;
b) an on-atom measurement performing means for measuring, on the sample surface and at a predetermined position, an on-atom Δf curve which illustrates a relationship between a distance Z between the tip of the probe and the sample surface and a variation (frequency shift) Δf of the oscillation frequency from the resonance frequency;
c) an extraction means for extracting an atomic defect adjacent to the position where a measurement is to be performed or has been performed by the on-atom measurement performing means by performing an image analysis of the concave-convex observation image;
d) an on-defect measurement performing means for measuring, on the sample surface and on the atomic defect extracted by the extraction means, an on-defect Δf curve which illustrates a relationship between a distance Z between the tip of the probe and the sample surface and a variation Δf of the oscillation frequency from the resonance frequency;
e) a difference computation means for calculating a difference Δf curve which is a difference between the on-atom Δf curve and the on-defect Δf curve; and
f) a conversion computation means for performing a computation of converting a frequency variation in the difference Δf curve into an interaction force to obtain a short-range interaction force at the position.

5. The atomic force microscope according to claim 4, further comprising a distribution information creator for sequentially obtaining the short-range interaction force for each of a plurality of positions set within a predetermined range to create information illustrating a distribution of the short-range interaction force within the predetermined range.

6. An interaction force measurement method using an atomic force microscope for measuring a short-range interaction force acting between an atom of a sample surface and a tip of a probe, by using a frequency modulation atomic force microscope for detecting, in oscillating with a resonance frequency a cantilever for holding the probe approximated to the sample surface, an oscillation frequency of the cantilever holding the probe, the oscillation frequency varying due to an interaction acting between an atom of the sample surface and a tip of the probe, and the measurement method comprising:
a) an on-atom measurement step for measuring, on a target atom on a sample surface, an on-atom Δf curve which illustrates a relationship between a distance Z between the tip of the probe and the sample surface and a variation (frequency shift) Δf of the oscillation frequency from the resonance frequency;
b) an on-defect measurement step for measuring, on an atomic defect on a sample surface, an on-defect Δf curve which illustrates a relationship between a distance Z between the tip of the probe and the sample surface and a variation Δf of the oscillation frequency from the resonance frequency;
c) a difference computation step for calculating a difference Δf curve which is a difference between the on-atom Δf curve and the on-defect Δf curve; and
d) a conversion computation step for performing a computation of converting a frequency variation in the difference Δf curve into an interaction force to obtain a short-range interaction force.

7. The interaction force measurement method using an atomic force microscope according to claim 6, wherein the Δf curve with a range of the distance Z up to 1 nm and below is obtained in the on-atom measurement step and the on-defect measurement step.

* * * * *